United States Patent
Mayer et al.

(10) Patent No.: US 6,965,437 B2
(45) Date of Patent: Nov. 15, 2005

(54) SCANNING UNIT FOR AN OPTICAL POSITION MEASURING DEVICE

(75) Inventors: Elmar J. Mayer, Nussdorf (DE); Wolfgang Holzapfel, Obing (DE)

(73) Assignee: Dr. Johannes Heidenhain GmbH, Traunruet (DE)

( * ) Notice: Subject to any disclaimer, the term of this patent is extended or adjusted under 35 U.S.C. 154(b) by 266 days.

(21) Appl. No.: 10/258,892

(22) PCT Filed: Apr. 14, 2001

(86) PCT No.: PCT/EP01/04277

§ 371 (c)(1), (2), (4) Date: Mar. 17, 2003

(87) PCT Pub. No.: WO01/84084

PCT Pub. Date: Nov. 8, 2001

(65) Prior Publication Data

US 2004/0046113 A1 Mar. 11, 2004

(51) Int. Cl.$^7$ ............................................. G01B 11/14
(52) U.S. Cl. .............. 356/614; 250/237 R; 250/237 G; 250/231.16
(58) Field of Search ................................ 356/614–617, 356/620, 600, 622; 250/559.29, 559.44, 237 R, 237 G, 231.13, 231.14, 231.16; 33/1 PT; 341/11, 13, 31

(56) References Cited

U.S. PATENT DOCUMENTS

| | | |
|---|---|---|
| 4,224,514 A | 9/1980 | Weber |
| 4,602,436 A | 7/1986 | Ernst |

(Continued)

FOREIGN PATENT DOCUMENTS

| | | |
|---|---|---|
| DE | 29 40 847 A1 | 6/1980 |
| DE | 36 16 144 A1 | 11/1987 |

(Continued)

OTHER PUBLICATIONS

Patent Abstracts of Japan document regarding Japanese patent reference 60–042616, published by Japanese Patent Office, one page. While the date of publication of the document is unknown, it is believed to have been published prior to Mar. 17, 2003.

Patent Abstracts of Japan document regarding Japanese patent reference 07–083704, published by Japanese Patent Office, 2003, one page.

Primary Examiner—Zandra V. Smith
Assistant Examiner—Roy M. Punnoose
(74) Attorney, Agent, or Firm—Brinks Hofer Gilson & Lione

(57) ABSTRACT

A scanning unit for an optical position measuring device for scanning a periodic strip pattern in a detector plane, the scanning unit including a detector arrangement including a first detector array with a first set of several radiation-sensitive detector elements, which are arranged next to each other in a first direction on a common support substrate and a second detector array including a second set of several radiation-sensitive detector elements arranged adjacent to the first detector array in a second direction perpendicular with respect to the first direction a detection plane. The second set of several radiation-sensitive detector elements are arranged next to each other in the first direction with a common period $P_{DET}$, and have a geometrically defined offset ($\Delta x_{1i}$) in the first direction with respect to the first set of several radiation-sensitive detector elements.

20 Claims, 4 Drawing Sheets

U.S. PATENT DOCUMENTS

| | | | |
|---|---|---|---|
| 4,782,229 A | | 11/1988 | Ernst |
| 5,666,196 A | * | 9/1997 | Ishii et al. .................. 356/499 |
| 5,750,984 A | * | 5/1998 | Ieki ....................... 250/231.16 |
| 5,841,134 A | | 11/1998 | Burgschat et al. |
| 6,198,534 B1 | | 3/2001 | Höfer et al. |
| 6,392,224 B1 | * | 5/2002 | Holzapfel et al. ..... 250/231.13 |
| 6,525,311 B1 | * | 2/2003 | Burgschat ............... 250/237 G |

FOREIGN PATENT DOCUMENTS

| | | |
|---|---|---|
| DE | 195 27 287 A1 | 1/1997 |
| DE | 198 33 439 A1 | 2/1999 |
| EP | 0 067 706 A2 | 12/1982 |
| EP | 0 157 177 A2 | 10/1985 |
| JP | 60-042616 A | 3/1985 |
| JP | 63-88708 U | 6/1988 |
| JP | 63-174019 U | 11/1988 |
| JP | 07-083704 A | 3/1995 |
| WO | WO 99/08074 | 2/1999 |
| WO | WO 99 08074 | 12/1999 |

* cited by examiner

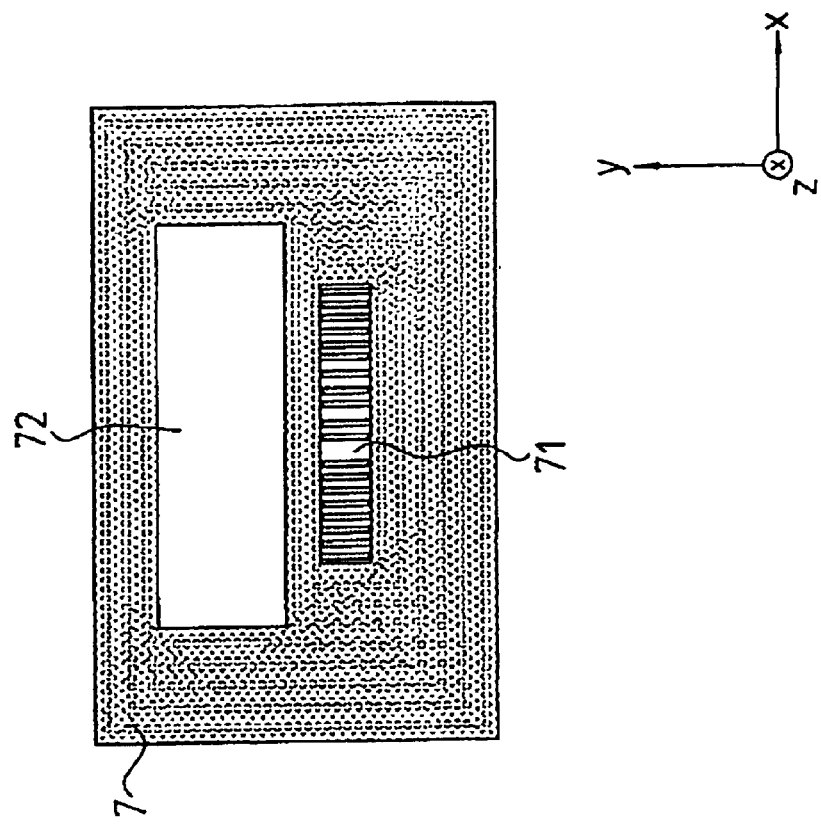
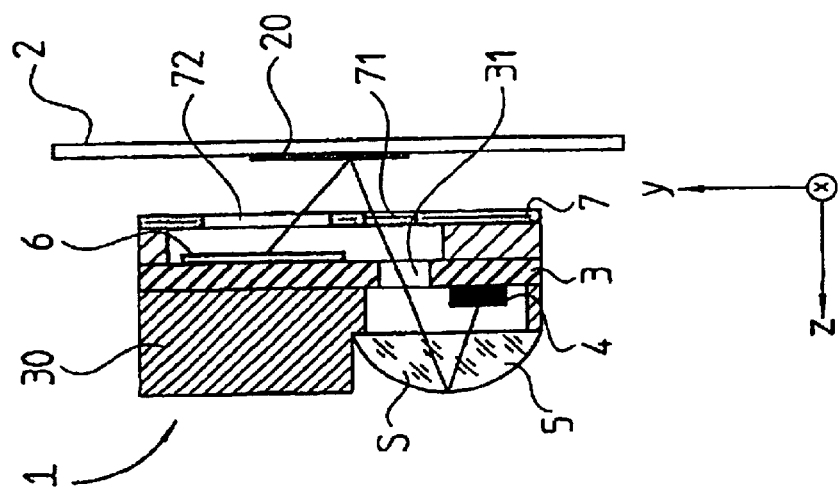

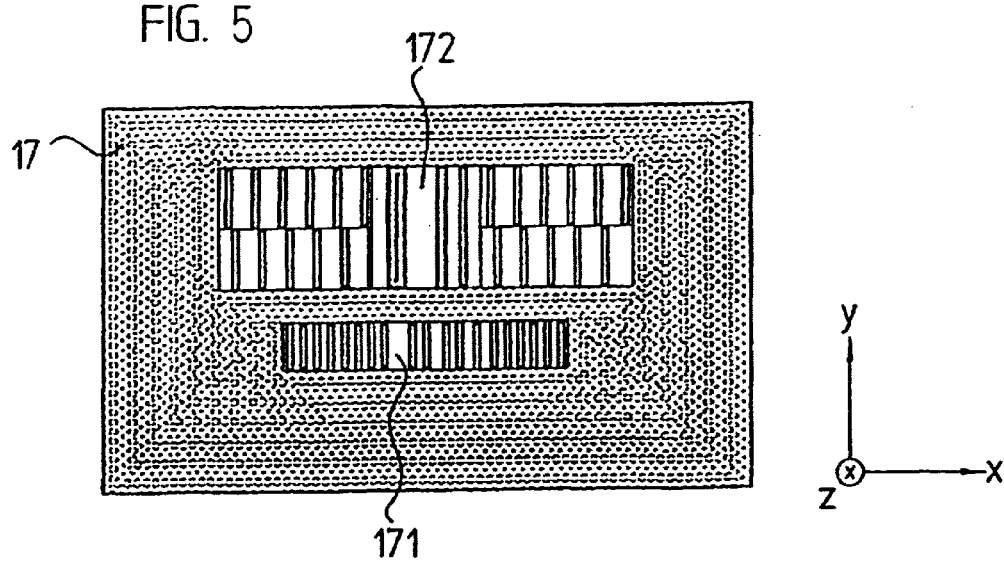
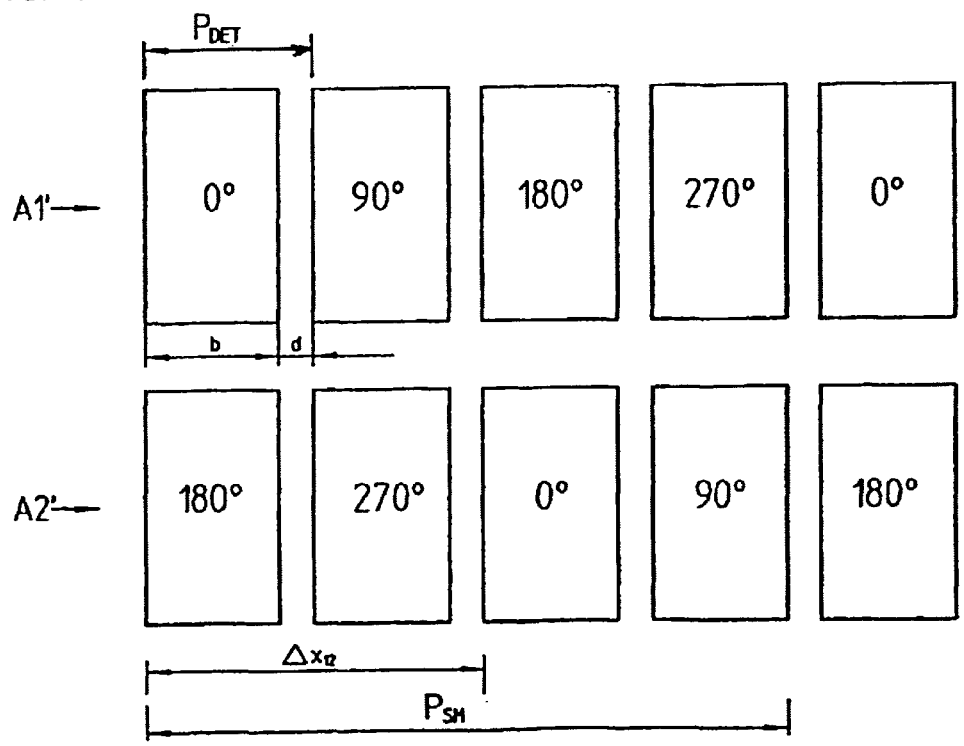

SCANNING UNIT FOR AN OPTICAL POSITION MEASURING DEVICE

The present invention relates to a scanning unit for an optical position measuring device.

DESCRIPTION OF THE RELATED ART

Customarily, known optical position measuring devices include a scale with a measuring graduation, as well as a scanning unit which is movable in relation to the latter. In case of a relative movement, a periodic modulation of a strip pattern results in a detection plane, which is detected by a suitable arrangement of electro-optical detector elements for generating incremental signals, and is evaluated for determining the relative positions of the scale and the scanning unit. Several phase-shifted incremental scanning signals are customarily generated for the position determination, wherein the phase shift is 90° as a rule. A so-called reference pulse signal is often additionally generated from the scanning of a reference marker for the precise determination of the absolute position, and is taken into account together with the information regarding the relative position, i.e. the incremental signals.

A scanning unit of the species is known, for example, from FIG. 3a of WO 99/08074. In this case the scanning unit proposed there is particularly suitable for scanning an incremental measuring graduation, into which a reference marking has been directly integrated at one or several positions. For this purpose the scanning unit includes a detector arrangement with a detector array with several radiation-sensitive detector elements, which are arranged adjoining each other in a first direction, for scanning the periodic strip pattern in the detection plane. In this case the first direction corresponds to the measuring direction x, along which the measuring graduation and the scanning unit are arranged so they are movable with respect to each other.

Because of the integration of the reference marking into the incremental measuring graduation, such as is represented in the lower portion of the mentioned FIG. 3a of WO 99/08074, an interference results at the location of the reference marking 7 in the course of the generation of the different phase-shifted incremental scanning signals. Such an interference will be called a short-period interference in what follows, which results because of the no longer strictly periodic measuring graduation in the area of the reference marking 7. As can be clearly seen in FIG. 3a, for example, reflecting partial areas of a periodic incremental incident light measuring graduation are removed in the area of the reference marking 7, so that the required a periodic structure of the reference marking 7 exists there. The lack of individual partial areas of the measuring graduation has the result that at this location only one of the generated phase-shifted incremental scanning signals is entirely or partially lost, for example the 0° scanning signal. However, the remaining scanning signals, i.e. the 90° scanning signal, the 180° scanning signal and the 270° scanning signal are generated as before. In this case errors result in the course of further processing of the incremental scanning signals, for example of the signal interpolation.

SUMMARY AND OBJECTS OF THE INVENTION

It is therefore an object of the present invention to disclose a scanning unit for an optical position measuring device which in the course of generating incremental scanning signals is disturbed as little as possible, even by possible short-period interferences in the scanned measuring graduation.

This object is attained by a scanning unit for an optical position measuring device for scanning a periodic strip pattern in a detector plane, the scanning unit including a detector arrangement including a first detector array with a first set of several radiation-sensitive detector elements, which are arranged next to each other in a first direction on a common support substrate and a second detector array including a second set of several radiation-sensitive detector elements arranged adjacent to the first detector array in a second direction perpendicular with respect to the first direction a detection plane. The second set of several radiation-sensitive detector elements are arranged next to each other in the first direction with a common period $P_{DET}$, and have a geometrically defined offset ($\Delta x_{fi}$) in the first direction with respect to the first set of several radiation-sensitive detector elements.

This object is furthermore attained by a scanning unit for an optical position measuring device for scanning a periodic snip pattern in a detector plane, the scanning unit including a detector arrangement including a first detector array with a first set of several radiation-sensitive detector elements, which are arranged next to each other in a first direction on a common support substrate and a second detector array including a second set of several radiation-sensitive detector elements arranged adjacent to the first detector array in a second direction perpendicular with respect to the first direction in a detection plane. The second set of several radiation-sensitive detector elements are arranged next to each other in the first direction with a common period $P_{DET}$, and are arranged in the second direction directly flush with the first set of several radiation-sensitive detector elements, but wherein those ones of the first set and second set of several radiation-sensitive detector elements that are flush with one another in the second direction each provide scanning signals with different phase relations.

The scanning unit in accordance with the present invention now assures that even possible short-period interferences with the scanned measuring graduation affect the generation of periodic incremental signals and their further processing in a less erroneous way. Because of the embodiment of the scanning units in accordance with the present invention, so-called single field scanning is assured, wherein the various phase-shifted incremental scanning signals are obtained from a single period of the scanned strip pattern. A uniform effect is achieved for all signals, even in case of a short-period interference.

Because of the reduced sensitivity to short-period interferences, the scanning units in accordance with the present invention are particularly suitable for position measuring devices having a reference marking which is integrated into the measuring graduation. However, the present invention can basically also be employed in connection with systems which do not provide such a generation of a reference pulse signal.

The present invention of course is advantageous even in case of intensive soiling of the measuring graduation, and in this case assures an extensively uniform effect on all phase-shifted scanning signals.

The present invention can of course be employed in incident light as well as transmitted light systems, it is also possible to design linear and rotatory position measuring device accordingly.

Two embodiments of scanning units disclosed herein differ in that, for one, there is a uniform strip pattern provided in the detector plane, which has narrow strips, or a short strip pattern period, while on the other hand several phase-shifted strip patterns, which are arranged one above the other in the detection plane with large strip pattern periods result. While the first mentioned system represents a position measuring system with a coarser resolution, the second case provides a system with high local resolution.

Further advantages, as well as details of the present invention ensue from the following description of the attached drawing figures.

Shown are in:

BRIEF DESCRIPTION OF THE DRAWINGS

FIG. 1 schematically shows a scanning beam path of a first embodiment of an optical position measuring device in accordance with the present invention, wherein a first embodiment of a scanning unit in accordance with the present invention is employed;

FIG. 2 schematically shows a view from above on an embodiment of a scanning plate of the position measuring device in FIG. 1 in accordance with the present invention;

FIG. 5 shows a view from above on a second embodiment of a scanning plate of a second embodiment of a position measuring device in accordance with the present invention, wherein a third embodiment of a scanning unit of the present invention is employed;

FIG. 6 shows a partial view of an embodiment of a detection plane of the third embodiment of the scanning unit of FIG. 5 in accordance with the present invention.

DESCRIPTION OF THE PREFERRED EMBODIMENT(S) OF THE INVENTION

Figure 3:
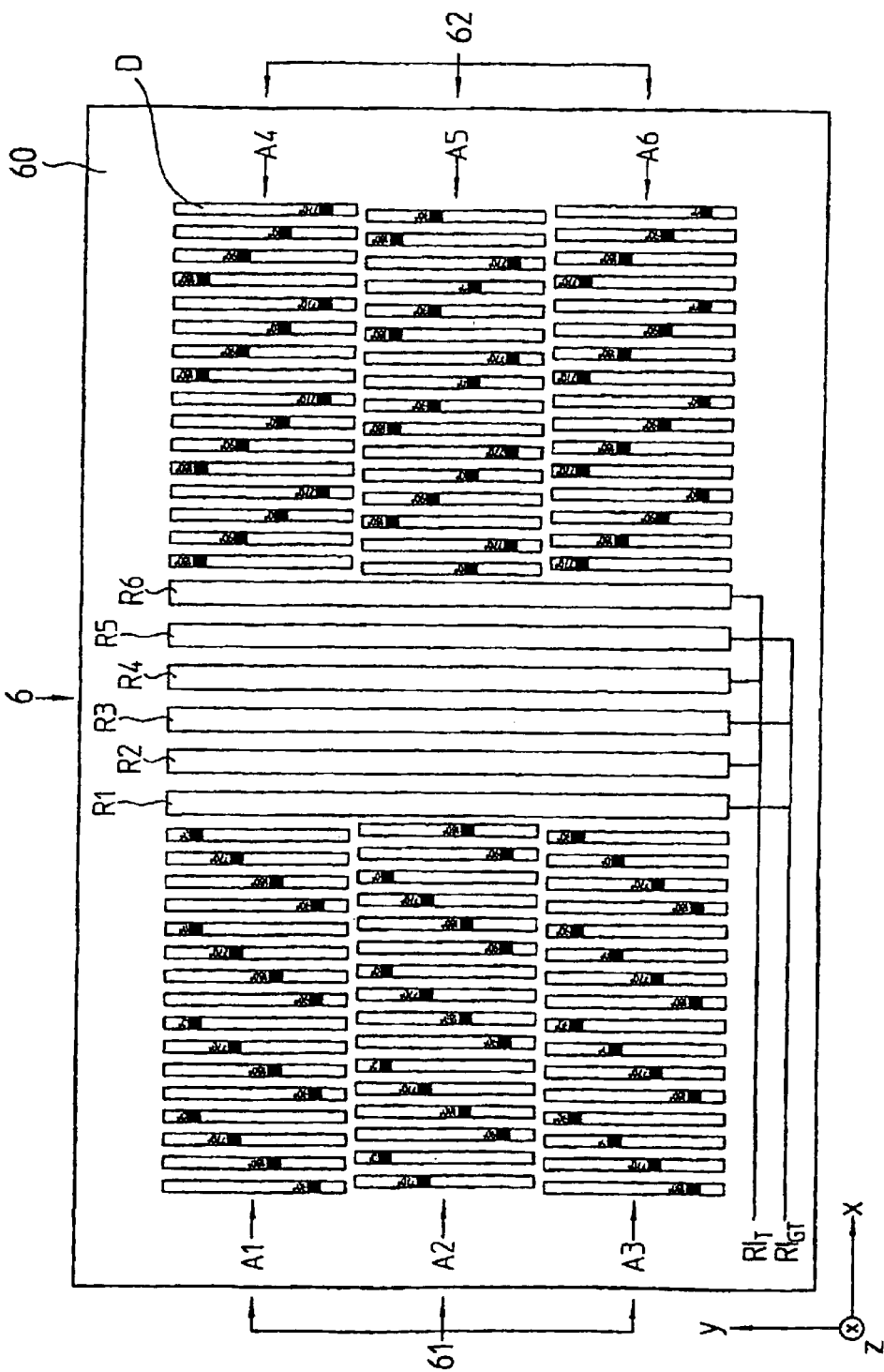
FIG. 3 shows a plan view of an embodiment of a detection plane of the position measuring device in FIG. 1 in accordance with the present invention.

The scanning beam path of a first optical position measuring device is represented in FIG. 1, wherein a first variant of the scanning unit of the present invention is employed. The first example of an incident light position measuring device represented in FIG. 1 includes a scale 2, as well as a scanning unit 1, which can be moved in relation to the scale 2 in the measuring direction x. The measuring direction x is oriented vertically with respect to the drawing plane.

A known incremental measuring graduation 20 is provided on the part of the scale 2, which extends in the measuring direction x and includes a periodic sequence of reflective and non-reflective partial areas. A reference marking is integrated into the measuring graduation at one or several defined locations, such as the one described in the already mentioned WO 99/08074. An absolute relationship can be provided in a known manner in the course of the position measurement by scanning the reference marking and of generating a reference pulse signal REF.

On the transmitting side, the scanning unit contains a light source 4, which is arranged on a board 3 and is preferably embodied as an LED. Moreover, on the transmitting side an optical collimator device 5 is assigned to the light source 4, which is embodied in the form of a reflecting cylinder lens. The optical collimator device 5 is fastened on a superstructure 30, which is connected with the board 3.

On the receiver side, the scanning unit 1 of the present invention has a detector arrangement 6, which is attached to the underside of the board 3 facing the scale 2. Reference is made to the subsequent description of FIG. 3 regarding the actual embodiment of the detector arrangement 6.

Moreover, a scanning plate 7 is also provided on the part of the scanning unit 1, which has a transmitting structure 71, as well as a transparent window area 72. A view from above on the scanning plate 7 is represented in FIG. 2.

The beams S emitted by the light source 4 initially reach the optical collimator device 5 and are deflected by it and partially collimated. Subsequently, the beams pass through an opening 31 in the board 3 and then pass through the transmitting structure 71 in the scanning plate 7 before impinging on the scale 2. From there, a back reflection of the beams in the direction toward the scanning unit 1 takes place. In the scanning unit 1, the beams pass through the transparent window area 72 in the scanning plate 7, which has no further optical effect, until the periodic strip pattern resulting in the detection plane is registered by the detector arrangement 6. By the scanning beam path represented, a strip pattern with a plurality of narrow strips results in the detection plane of the scanning unit.

The design of suitable detector arrangements 6 in the detection plane of such an optical position measuring device will be explained in what follows by FIGS. 3 and 4. Here, FIG. 3 shows a total plan view of the detector arrangement 6 employed in the example in FIG. 1.

As can be seen in FIG. 3, the represented detector arrangement 6 includes a total of six detector arrays A1 to A6, which in this example are used for generating n=4 phase-shifted incremental scanning signals. In this case the scanning signals have a relative phase shift of 90° with respect to each other; in this connection the scanning signals will be called S0, S90, S180, S270 in what follows. The number assigned in FIG. 3 to each detector element D shows the relative phase relation of the scanning signals S0, S90, S180, S270, which is generated by the respective detector element D in the course of scanning the periodic strip pattern in the detection plane. Thus, as can be seen in FIG. 3, each individual detector array A1 to A6 already provides the required four phase-shifted scanning signals S0, S90, S180, S270.

Basically, for one, the equiphased detector elements D of each individual detector array A1 to A6 are connected in an electrically conductive manner. On the other hand, it is moreover also provided to connect the equiphased detector elements D of the different detector arrays A1 to A6 in an electrically conductive manner. For reasons of better clarity, the respective connecting lines have not been represented in FIG. 3. With respect to an advantageous variant regarding the connection of the many equiphased detector elements D, reference is made to a corresponding U.S. patent application Ser. No. 10/258,964, filed on Oct. 28, 2002, the entire contents of which are incorporated herein by reference.

The represented embodiment of a detector arrangement 6 of the scanning device of the present invention furthermore also includes, besides the detector arrays A1 to A6 for generating one of several reference pulse signals REF, a total of six reference pulse detector elements R1 to R6. By the reference pulse detector elements R1 to R6 it is possible to scan a reference marking integrated into the measuring graduation. The reference pulse detector elements R1 to R6 have been placed into the center of the detector arrangement 6. In this case a first group G1 with three detector arrays A1 to A3 is arranged, adjoining in the measuring direction x, to the left of the reference pulse detector elements R1 to R6; the second group G2 of three detector arrays A4 to A6 is arranged in the measuring direction x adjoining the reference pulse detector elements R1 to R6 to the right. As can be seen in FIG. 3, every second of the reference pulse detector elements R1 to R6 are connected with each other in an electrically conducting manner. A so-called reference pulse clock signal $RI_T$ is generated in this case via a first group of reference pulse detector elements R1, R3 and R5; the second group with the connected reference pulse detector elements R2, R4 and R6 provides a so-called reference pulse push-pull signal $RI_{GT}$. Regarding the processing of the signals $RI_T$ and $RI_{GT}$ to form the reference pulse signal REF in the end, reference is made here merely to WO 99/08074.

The detector arrays A1 to A6 provided for generating the incremental scanning signals S0, S90, S180, S270 each includes several radiation-sensitive detector elements D. In this example, all detector arrays A1 to A6 have the same number of detector elements D. In this case the detector elements D are each arranged next to each other in a first direction x on a common support substrate 60. The first direction x is identical with the measuring direction x mentioned in FIG. 1. In a possible embodiment, approximately 60 detector elements D are used per detector array A1 to A6. In FIG. 3 only a reduced number of detector elements D per detector array A1 to A6 has been represented for reasons of improved clarity.

In the example represented, the six detector arrays A1 to A6 all have the basically identical structure; important for the present invention is their relative arrangement, which will be discussed in detail at a later time. Each of the detector arrays A1 to A6 includes a plurality of rectangular-shaped detector elements D, which have a width b in the first direction x, and a length l in the second direction y vertically with respect thereto. Furthermore, in all six detector arrays A1 to A6 the detector elements D are arranged in the first direction x periodically with the detector period $P_{DET}$. The periodic strip pattern resulting in the detector plane is scanned with the aid of the detector arrays A1 to A6, which has the strip pattern period $P_{SM}$, which is fine in this case. Regarding the values defined in this way, reference is made to the further exemplary embodiment in FIG. 4, in which these values have all been explicitly drawn.

It is now decisive for the present invention that in a second direction y vertically to the first direction x several detector arrays A1 to A3, or A4 to A6, are arranged next to each other at a distance $D_y$. In this case each one of the detector arrays A1 to A6 basically provides the four required phase-shifted scanning signals; the provision of several detector arrays A1 to A6 in the manner represented, in the end assures the desired single field scanning, wherein all phase-shifted scanning signals S0, S90, S180, S270 result from a scanned period $P_{SM}$ of the strip pattern. Then, even in case of a possible short-period interference, an even influencing of all scanning signals S0, S90, S180, S270 within a strip pattern period $P_{SM}$ exists.

In this case the detector elements D of the further detector arrays A2, A5, or A3, A6, are arranged offset by a defined amount in the first direction x with respect to the detector elements D of the first detector array A1 or A4.

The offset between the individual detector arrays has been selected in such a way that it is possible to generate the scanning signals S0, S90, S180, S270, which in this example are n=4 phase-shifted from a single scanned period $P_{SM}$ of the strip pattern, by all detector arrays A1 to A3, or A4 to A6 which adjoin each other in the second direction y.

If the detector arrays A1 to A3, or A4 to A6, which respectively adjoin each other in the second direction y, are arranged correspondingly offset, the above mentioned problems in connection with possible short-period interferences in the measuring graduation can be clearly minimized. For a more detailed explanation, reference is now made to FIG. 4 in this connection, which represents a further detector arrangement 6' in a schematic partial representation.

Figure 4:
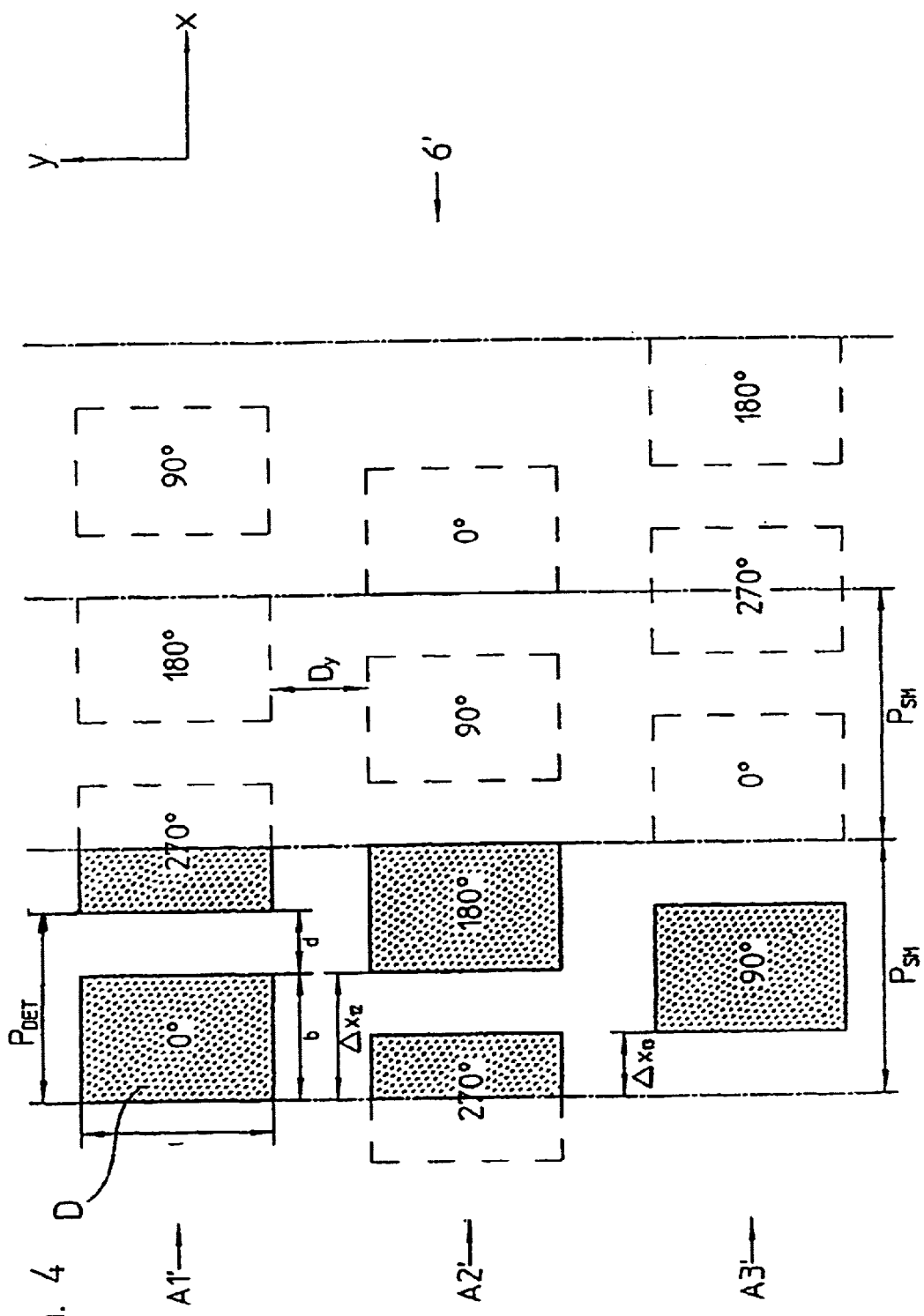
FIG. 4 shows an enlarged plan view of an embodiment of a detection plane for explaining certain geometric conditions in a second embodiment of a scanning unit in accordance with the present invention.

In the exemplary embodiment of FIG. 4, the fine strip pattern generated in the detection plane has the strip pattern period $P_{SM}$=40 μm. As shown in FIG. 4. $P_{SM}$ defines the periodicity/pitch of the regularly arranged strips in the fine strip pattern. The width b of the various detector elements D has been selected in accordance with b=½$P_{SM}$=20 μm. It already follows from this dimensioning of the widths b of the detector elements D, that no purely single field scanning can be provided with the aid of a single detector array A1', A2' or A3', since it is not possible to arrange all required detector elements D, which provide the scanning signal phase-shifted by 90°, within a scanned strip pattern period $P_{SM}$. The arrangement of the detector elements D of the detector period $P_{DET}$, which is repeated many times in the measuring direction x, within a single detector array A1', A2' or A3' therefore only makes possible a so-called quasi single field scanning. Although this assures insensitivity in case of more extensive soiling of the scanned measuring graduation, it is affected with the problems mentioned at the outset in case of short-period interferences with the measuring graduation. In the represented example it is provided to select the periodicity $P_{DET}$ of the detector elements D within each detector array A1' to A3' in accordance with $P_{DET}$=b+d=30 μm, wherein b indicates the detector width in the first direction x, and d identifies the distance between adjoining detector elements D in the first direction x. The distance between two adjoining detector elements D of a detector array A1', A2', A3' therefore is d=10 μm.

With detector elements D arranged in such a way, the phase relation 0° therefore results for the scanning signal S0 generated in the first detector element D in the first detector array A1'. The detector element D which adjoins it to the right in the measuring direction x delivers incremental scanning signals S270 of the relative phase relation 270° at the stated values $P_{SM}$ b and d. Toward the right, detector elements D—not represented—adjoin, which provide scanning signals S180, S90 with the relative phase relations 180°, 90°, before another detector element D follows, which generates scanning elements S0 with the relative phase relation 0°, etc. The basically identical sequence of the scanning signals S0, S270, S180, S90 generated by the detector elements D is also provided in the two further required detector arrays A2' and A3', which are arranged adjacent to the first detector array A1' in the y direction. The distance between each of the adjoining detector arrays A1', A2', A3' is identified by $D_y$.

It is of course possible in connection with alternative exemplary embodiments to provide different sequences of the various phase relations in the x direction.

In the different detector arrays A1', A2', A3', the equiphased detector elements D are arranged offset with respect to each other in the first direction x, or with respect to the first detector array A1', the detector arrays A2' and A3' have a definite phase offset $\Delta\phi_{1i}$, or a corresponding geometric offset $\Delta x_{1i}$ (i=2, 3 in the present example) in the first direction x. The cited phase relations of the detector elements D in the various detector arrays A1' to A3' result from the corresponding geometric offset.

In this case the detector elements D of the second detector array A2' are all arranged phase-shifted by $\Delta\phi_{12}$=180° with respect to the first detector elements D of the first detector array A1'; the detector elements D of the third detector array A3' are arranged phase-shifted by $\Delta\phi_{13}=90°$ with respect to the detector elements D of the first detector array A1'.

Since, as explained, in the system in accordance with FIG. 1 no scanning structure is provided between the measuring graduation and the detection plane, the phase separation, or the generation of the desired phase-shifted scanning signals results from the explained arrangement of the various detector elements D. In this case, each detector array A1 to A6 basically already provides all four desired phase-shifted scanning signals S0 to S270; the described arrangement next to each other of several detector arrays in the y direction furthermore assures the desired insensitivity to short-period interferences.

With the mentioned dimensioning between the first and the second detector array A1', A2', the corresponding geometric offset $\Delta x_{12}=20$ μm in absolute values; between the first and the third detector array A1', A3' the mentioned phase offset corresponds to the desired geometric offset $\Delta x_{13}=10$ μm.

It is assured because of this selection of the offset $\Delta\phi_{1i}$, or $\Delta x_{1i}$ between the detector elements D of the various detector arrays A1', A2', A3', that in the end it will be possible to also obtain the four phase-shifted scanning signals S0, S90, S180 and S270 with the relative phase relations of 0°, 90°, 180° and 270° from a period $P_{SM}$ of the scanned strip pattern. In the representation of FIG. 4 those areas of the detector elements D are shown hatched which perhaps add in the generation of the phase-shifted scanning signals S0, S90, S180 and S270 from the first scanned period $P_{SM}$ from the left of the strip pattern. Further detector elements D in the different detector arrays A1' to A3' are each only shown in dashed lines.

In this case the arrangement of the three detector arrays A1' to A3' represented from the top to the bottom basically has no relevance, i.e. it would of course be possible to provide any other sequence of the three detector arrays A1' to A3' in the y direction. Only their relative arrangement with respect to each other in the first direction x, i.e. the appropriate respective relative offset in the measuring direction x, is important for the desired effect.

Of course, based on the considerations in connection with the present invention, other embodiments options, besides the explained examples, also exist.

Thus, the required number k=3 detector arrays A1 to A3, A4 to A6, A1' to A3', which are arranged next to each other in the second direction y results from the selection of the actual values of the strip pattern period $P_{SM}$, the detector period $P_{DET}$ and the number n of the desired phase-shifted signals (n=2, 3, 4 . . . ). In principle, other predetermined values can also require another number k of adjoining detector arrays. In this case the following general equations (1a), (1b) apply to the number k of required detector arrays to assure the desired single field scanning:

$$P_{DET}/P_{SM} \text{ for } P_{DET}<P_{SM} \qquad \text{(Equ. 1a)}$$

or $$k=n \text{ for } P_{DET}>P_{SM}. \qquad \text{(Equ. 1b)}$$

Therefore, in accordance with Equ. (1a) the value k in the above explained equations is the result of n=4, $P_{DET}=30$ μm and $P_{SM}=40$ μm, namely $$k=(4*30 \text{ μm})/40 \text{ μm}=3$$

which is the required number of adjoining detector arrays.

The respective geometric offset $\Delta x_{1i}$ of the i-th detector array Ai (i=2, 3 . . . k) of a total of k required detector arrays with respect to a first detector array A1 can be generally stated as follows:

$$\Delta x_{1i}=m_i*P_{SM}/n \qquad \text{(Equ. 2)}$$

wherein i=2 . . . k, n=2, 3, 4 . . . , and $m_i=1, 2 \ldots k-1$.

The respective phase offset $\Delta\phi_{i1}$ can be determined in a known manner from the required geometric offset $\Delta x_{1i}$.

As already indicated above, in this case the basic sequence of the arrangements of the various detector arrays, starting with a first detector array, is of no importance.

The considerations in accordance with the present invention can therefore also be transferred to further variations of scanning units.

In closing, a third embodiment of a scanning unit in accordance with the present invention will be described, which is preferably employed in a position measuring device having a slightly modified beam path in comparison with the position measuring device from FIG. 1. Thus, in contrast to the first example in FIG. 1, the corresponding position measuring device includes a scanning structure in the transparent window area 72 of the scanning plate 7. A view from above on the associated scanning plate in this second exemplary embodiment of a position measuring device is represented in FIG. 5. As can be clearly seen, the scanning plate 17 again includes a transmitting structure 171; but an additional scanning structure 172 is yet provided in the adjacent area. The scanning structure 172 in this example includes a total of four separate scanning fields for generating the incremental scanning signals. The scanning fields, which are arranged next to each other in the y direction, here have a defined offset with respect to each other. The portion of the scanning structure 172 which is used for generating the reference pulse signals can be seen in the center area.

Thus, in contrast to the first example, the beams reflected from the measuring graduation pass through the scanning structure 172 in the scanning plate 17 prior to impinging on the detector plane. The result of this scanning beam path is that a clearly coarser strip pattern, i.e. a clearly greater strip pattern period $P_{SM}$ than in the first example, exists. In this case a detector array is assigned in the detector plane to each of the separate scanning fields. This again results in a slightly modified embodiment of the detector arrangement, which will now be explained by FIG. 6.

FIG. 6 again shows a partial plan view of a suitable detector arrangement for the third variant of a scanning unit in accordance with the present invention in connection with the scanned strip pattern, which has the strip pattern period $P_{SM}=500$ μm.

Again, the widths b of the individual detector elements D have all been selected to be identical so that b=115 μm; as the mutual distance d of directly adjacent detector elements D, d=10 μm is selected, so that a detector period $P_{DET}=P_{SM}/4=125$ μm results. Detector arrays A1", A2", which adjoin each other in the y direction are at a distance of $D_y$.

As explained in connection with the previous example, each individual detector array A1", A2" basically already generates the required four phase-shifted scanning signals S0 to S270. Again, the adjoining arrangement of several detector arrays A1", A2" is merely used for the desired compensation of short-period interferences in the measuring graduation. In this case, only the most important short-period interferences are compensated in this embodiment, because within the graduation period of the scanned measuring graduation only the scanning signals S0 and S180, or S90 and S270, which are counter-phased, or phase-shifted by 180°, are generated. Therefore the mentioned short-period interferences in the end have an identical effect on the offset portions of the counter-phased scanning signals, so that the further processed difference signal from these scanning signals does not have a distorting offset portion even in case of such interferences.

Because of the now clearly coarser strip pattern period $P_{SM}$, a slightly modified arrangement of the adjacent detector arrays A1" and A2", or of the corresponding detector elements D, is also provided. Thus, the individual detector elements D of the detector arrays A1" and A2" following each other in the y direction are arranged without a geometric relative offset in relation to each other in the x direction, i.e. the detector elements D are arranged to be exactly flush in principle. In this system the detector elements, which are arranged directly one below the other, of different detector arrays A1" and A2" do not register equiphased scanning signals; instead the detector elements which register equiphased scanning signals are arranged offset with respect to each other in the measuring direction x in the different detector arrays A1", A2". For example, the detector elements in the first and second detector arrays A1", or A2", each of which records equiphased scanning signals, are arranged offset with respect to each other in the positive x direction by the amount $\Delta x_{i2}$.

With this scanning principle, the different phase relations of the detector elements D which are each adjacent to each other also result from the partial areas of the scanning structure 172 which are offset with respect to each other in the measuring direction x, such as schematically indicated in FIG. 5. Therefore, in this optical position measuring device the phase separation takes place by means of the appropriately embodied scanning structure 172 in the scanning plate 17 in connection with the offset amount $\Delta x_{i2}$ of the detector elements D.

f only two detector arrays A1", or A2" arranged one above the other are provided in the represented example, $\Delta x_{i2}$ approximately equals $P_{SM}/2 = 250\ \mu m$. Here, the offset of the partial areas of the scanning structure must be selected in such a way that the associated strip patterns in the detection plane also have an offset of $=P_{SM}/2$; incidentally, this offset is not represented correctly to scale in FIG. 5 and instead is only schematically indicated. In this way the detector elements, which are arranged flush one above the other provide the desired scanning signals.

In general, this third embodiment can also be embodied with n detector arrays arranged on top of each other for generating the desired n phase-shifted scanning signals. In this case all n phase-shifted scanning signals are generated by the n detector elements D arranged flush on top of each other. The detector elements D of the detector arrays Ai (i=2, 3 . . . ), each of which records equiphased scanning signals, are therefore arranged offset in the positive x direction by the amount $\Delta x_{1i}$ in comparison with the corresponding detector element of the first detector array A1. The amount $\Delta x_{1i}$ generally is the result of the following equation (3):

$$\Delta x_{1i} = m_i * P_{SM}/n \qquad \text{(Equ. 3)}$$

wherein i=2, 3 . . . , n=2, 3, 4 . . . , and $m_i$=1, 2 . . . n−1.

The partial areas of the scanning structure assigned to the detector arrays must here be arranged in such a way that in the detector plane the associated strip patterns have an offset of $m_i * P_{SM}/n$. The detector period $P_{DET}$ always is $P_{DET} = P_{SM}/n$.

Incidentally, in place of the scanning structure, other scanning structures can also be divided into several partial areas in the scanning beam path, which are then assigned to corresponding detector arrays in turn, for example it would also be possible accordingly to divide a transmission graduation structure, or a measuring graduation in such a way, etc.

Therefore, besides the explicitly described examples, a number of alternative embodiments exist within the scope of the present invention.

What is claimed is:

1. A scanning unit for an optical position measuring device for scanning a periodic strip pattern in a detector plane, comprising:

a detector arrangement comprising a first detector array with a first set of n number of radiation-sensitive detector elements, which are arranged in succession next to each other in a first direction on a common support substrate with a common first period, a second detector array arranged adjacent to said first detector array in a second direction perpendicular with respect to said first direction in a detection plane, wherein said second detector array comprises second set of n number of radiation-sensitive detector elements arranged in succession next to each other in said first direction with a common second period $P_{DET}$, and have a geometrically defined offset ($\Delta x_{1i}$) in said first direction with respect to said first set of several radiation-sensitive detector elements so that n phase-shifted signals are generated by said first set and said second set of n number of radiation-sensitive detector elements, wherein said n phase-shifted signals have different phases with respect to each other, wherein n=2, 3, 4, . . . .

2. The scanning unit in accordance with claim 1, wherein a total of k detector arrays is provided, and said offset ($\Delta x_{1i}$) of detector elements of said k detector arrays has been selected to be such that n scanning signals with a relative phase-shift of 360°/n result from said detector elements of said k detector arrays from a scanning of a period $P_{SM}$ of a strip pattern.

3. The scanning unit in accordance with claim 2, wherein $$k = (n * P_{DET})/P_{SM} \text{ for } P_{DET} < P_{SM}$$

or $$k = n \text{ for } P_{DET} < P_{SM},$$

wherein n=2, 3, 4 . . . , and $P_{DET}$=detector period.

4. The scanning unit in accordance with claim 3, wherein a geometrical defined offset $\Delta x_{1i}$ of the i-th detector array Ai of a total of k required detector arrays in comparison with said first detector array in said measuring direction x is $$\Delta x_{1i} = m_i * P_{SM}/n,$$

wherein i=2 . . . k, n=2, 3, 4. . . , and $m_i$=1, 2 . . . k−1.

5. The scanning unit in accordance with claim 3, wherein k=3 and n=4.

6. The scanning unit in accordance with claim 2, wherein each of said detector elements of said k detector arrays is embodied to be rectangular, and are of a width b in said first direction and a length 1 in said second direction.

7. The scanning unit in accordance with claim 6, wherein detector elements of adjoining detector arrays are at a distance $D_y$ from each other.

8. The scanning unit in accordance with claim 2, wherein within each detector array those detector elements which provide scanning signals of an identical phase relation are connected with each other in an electrically conducting manner.

9. The scanning unit in accordance with claim 8, wherein detector elements of different detector arrays which provide scanning signals of an identical phase relation are also connected with each other in an electrically conducting manner.

10. The scanning unit in accordance with claim 1, wherein said first detector array and said second detector array define a first group of detector arrays and a second group of detector arrays, between which several reference pulse detector elements are arranged.

11. The scanning unit in accordance with claim 10, wherein every second one of said reference pulse detector elements are connected with each other in an electrically conductive manner.

12. The scanning unit in accordance with claim 10, wherein the number of said first set of several radiation-sensitive detector elements is equal to the number of said second set of several radiation-sensitive detector elements.

13. A scanning unit for an optical position measuring device for scanning a periodic strip pattern in a detector plane, comprising:

a detector arrangement comprising a first detector array with a first set of several radiation-sensitive detector elements, which are arranged next to each other in a first direction on a common support substrate;

a second detector array arranged adjacent to said first detector array in a second direction perpendicular with respect to said first direction in a detection plane, wherein said second detector array comprises a second set of several radiation-sensitive detector elements arranged next to each other in said first direction with a common period $P_{DET}$, and arranged in said second direction so as to be directly aligned flush with said first set of several radiation-sensitive detector elements along said first direction, but wherein those ones of said first set and second set of several radiation-sensitive detector elements that are directly aligned flush with one another along said first direction each provide scanning signals with different phase relations.

14. The scanning unit in accordance with claim 13, wherein n detector arrays, including said first and second detector arrays, generate n scanning signals of a relative phase shift of 360°/n are provided, and equiphased detector elements of adjacent ones of said n detector arrays are arranged offset with respect to each in said first direction by an amount $$\Delta x_{1,i} = m_i * P_{SM}/n$$

wherein i=2, 3 ..., n=2, 3, 4 ..., and $m_i$=1, 2 ... n−1, and wherein $P_{SM}$ defines the strip pattern period.

15. The scanning unit in accordance with claim 13, wherein two of said n detector arrays are arranged next to each other, and equiphased detector elements of said two of said n detector arrays are arranged offset from each other by an amount $P_{SM}/2$ in said first direction, wherein $P_{SM}$ defines the strip pattern period.

16. The scanning unit in accordance with claim 13, wherein each of said detector elements of said n detector arrays is embodied to be rectangular and is of a width b in said first direction and a length 1 in said second direction.

17. The scanning unit in accordance with claim 16, wherein detector elements of adjoining detector arrays are at a distance $D_y$ from each other.

18. The scanning unit in accordance with claim 13, wherein within each of said n detector array those detector elements which provide scanning signals of an identical phase relation are connected with each other in an electrically conducting manner.

19. The scanning unit in accordance with claim 18, wherein those detector elements of said n detector arrays which provide scanning signals of an identical phase relation are also connected with each other in an electrically conducting manner.

20. The scanning unit in accordance with claim 13, wherein the number of said first set of several radiation-sensitive detector elements is equal to the number of said second set of several radiation-sensitive detector elements.

* * * * *

UNITED STATES PATENT AND TRADEMARK OFFICE
CERTIFICATE OF CORRECTION

PATENT NO. : 6,965,437 B2 Page 1 of 1
APPLICATION NO. : 10/258892
DATED : November 15, 2005
INVENTOR(S) : Elmar J. Mayer et al.

It is certified that error appears in the above-identified patent and that said Letters Patent is hereby corrected as shown below:

Column 10, in claim 3, line 4, delete "for $P_{DET}<P_{SM}$," and substitute --for $P_{DET}>P_{SM}$,-- in its place.

Signed and Sealed this

Fifth Day of December, 2006

JON W. DUDAS
*Director of the United States Patent and Trademark Office*